(12) United States Patent
Ormerod et al.

(10) Patent No.: US 10,752,861 B2
(45) Date of Patent: Aug. 25, 2020

(54) SEPARATION OF UNSATURATED ORGANIC COMPOUNDS

(71) Applicant: VITO NV, Mol (BE)

(72) Inventors: Dominic Ormerod, Mol (BE); Anita Buekenhoudt, Mol (BE); Matthieu Dorbec, Mol (BE); Wim Porto-Carrero, Mol (BE)

(73) Assignee: VITO NV, Mol (BE)

( * ) Notice: Subject to any disclaimer, the term of this patent is extended or adjusted under 35 U.S.C. 154(b) by 117 days.

(21) Appl. No.: 16/063,120

(22) PCT Filed: Dec. 16, 2016

(86) PCT No.: PCT/EP2016/081517
§ 371 (c)(1),
(2) Date: Jun. 15, 2018

(87) PCT Pub. No.: WO2017/103164
PCT Pub. Date: Jun. 22, 2017

(65) Prior Publication Data
US 2020/0024545 A1   Jan. 23, 2020

(30) Foreign Application Priority Data

Dec. 17, 2015 (EP) ..................... 15200940

(51) Int. Cl.
*C11B 3/00* (2006.01)
*B01D 61/02* (2006.01)
(Continued)

(52) U.S. Cl.
CPC ............ *C11B 3/008* (2013.01); *B01D 61/027* (2013.01); *B01D 67/0093* (2013.01); *B01D 71/024* (2013.01)

(58) Field of Classification Search
CPC ... C11B 3/008; B01D 61/027; B01D 67/0093; B01D 71/024
(Continued)

(56) References Cited

U.S. PATENT DOCUMENTS

| 4,297,292 A | 10/1981 | Logan et al. |
| 4,961,881 A * | 10/1990 | Ou ..................... C07C 67/56 554/193 |
| 2017/0009047 A1 | 1/2017 | Kinoshita et al. |

FOREIGN PATENT DOCUMENTS

| JP | 2000-44983 A | 2/2000 | |
| WO | 2010/106167 A1 | 9/2010 | |
| WO | WO-2010106167 A1 * | 9/2010 | ......... B01D 67/0093 |

OTHER PUBLICATIONS

S-Q Sun et al: "Preparation and antibacterial activity of Ag—TiO 2 composite film by liquid phase deposition (LPD) method", Bull. Mater Sci. Indian Academy of Sciences, Feb. 1, 2008 (Feb. 1, 2008), pp. 61-66.
(Continued)

*Primary Examiner* — Deborah D Carr
(74) *Attorney, Agent, or Firm* — Merchant & Gould P.C.

(57) ABSTRACT

A membrane based separation method is for the separation or enrichment of one or more unsaturated compounds from mixtures of chemically similar organic compounds having a different degree of unsaturation, using a membrane, such as an inorganic membrane, functionalized with a metal, such as silver. An inorganic membrane, preferably modified or grafted with an organic functional group, is further functionalized with a metal, such as silver, for use in the membrane based separation methods.

17 Claims, 2 Drawing Sheets

(51) Int. Cl.
*B01D 67/00* (2006.01)
*B01D 71/02* (2006.01)

(58) Field of Classification Search
USPC .......................................................... 554/175
See application file for complete search history.

(56) References Cited

OTHER PUBLICATIONS

Yuqing Lin et al: "Enhancing mechanical and photocatalytic performances on TiO2/Ti composite ultrafiltration membranes via Ag doping method", Separation and Purification Technology, vol. 145, May 1, 2015 (May 1, 2015), pp. 29-38.
International Search Report and Written Opinion from International Application No. PCT/EP2016/081517, dated Apr. 13, 2017.

* cited by examiner

SEPARATION OF UNSATURATED ORGANIC COMPOUNDS

This application is a National Stage Application of PCT/EP2016/081517, filed 16 Dec. 2016, which claims benefit of Serial No. 15200940.3, filed 17 Dec. 2015 in Europe and which applications are incorporated herein by reference. To the extent appropriate, a claim of priority is made to each of the above-disclosed applications.

FIELD OF THE INVENTION

The present invention relates to the field of separation membranes and purification methods involving membrane separation. Particularly, the present invention relates to the separation of unsaturated compounds from mixtures of chemically similar organic compounds having a different degree of unsaturation, such as mixtures of saturated and unsaturated carboxylic acids, and membranes used in this separation process.

BACKGROUND TO THE INVENTION

In many fields, the skilled person is confronted with the need to separate one or more organic compounds from a mixture of organic compounds sharing similar structures and properties but differing in the number and/or position of the double bonds. As the individual compounds with different degree of unsaturation in such mixtures may differ only slightly in their physical properties, exhibiting similar molecular weight, boiling point and solubility, separation procedures based on these properties are generally ineffective to obtain high purities or highly enriched fractions of one or more of the different organic compounds. Some examples include the separation of unsaturated aliphatic hydrocarbons (which find use as the reactive monomers for preparing synthetic polymers) from hydrocarbon mixtures in which they are found and the separation of mixtures of saturated and unsaturated carboxylic acids, such as mixtures of fatty acids or esters thereof, into the individual components or into mixtures enriched in one or more of the individual components.

For instance, fatty acids or fatty acid esters present in mixtures are generally difficult to separate, because they possess similar molecular weights and the same set of functional groups. In this context, fatty acids typically possess a carboxylic acid functional group and 0, 1, 2, or more carbon-carbon double bonds. The lack of an economically viable separation or fractionation method limits the application of fatty acids, such as e.g. as a starting material for industrial applications. Indeed, fatty acids present in oil or fat occur generally as a mixture of saturated and unsaturated fatty acids which reflect the fatty acid composition of the oil or fat, which is dependent on the source of the oil/fat. It is noted that there are specific uses for fatty acid materials having, respectively, higher or lower degrees of unsaturation. Depending on the application, a fatty acid (ester) product becomes more valuable as the proportion of saturated or unsaturated components is increased in the product. Thus, it is often desirable to be able to ensure a selective recovery of fatty acids.

Membrane-based separation methods are inexpensive, easy to implement, and readily scaled up to separate many tons of material. Membrane separation is typically one of the simplest and least energy intensive methods of purification. However, membranes are usually not suitable for the separation of mixtures comprising saturated and unsaturated compounds having similar properties and structures, such as size and polarity. For instance, separation by nanoporous membranes requires organic molecules with large differences in molecular weight, wherein the larger molecule is mostly retained while the smaller molecule passes through the membrane.

There is a need in the art to develop inexpensive and practical separation methods and tools which allow to separate or fractionate mixtures of organic compounds having very similar structural and physical properties but differing in the number and/or position of unsaturated (double) bonds, into the individual compounds or into mixtures enriched in one or more of said organic compounds.

SUMMARY OF THE INVENTION

The inventors have developed an efficient membrane based separation method for the separation or enrichment of at least one organic compound from a mixture of at least two organic compounds differing essentially only in the number and/or position of unsaturated double bonds, wherein said membrane is functionalized with at least one metal M2.

Accordingly, in a first aspect, the present invention provides methods for the separation of a mixture comprising at least two different organic compounds comprising a hydrocarbon moiety, the hydrocarbon moiety differing between the at least two organic compounds in the number and/or position of carbon-carbon double bonds, said method comprising the step of contacting said mixture with a membrane, preferably an inorganic membrane, wherein said inorganic membrane comprises at least a hydroxide or oxide of one first metal M1 and wherein said membrane, preferably inorganic membrane, is functionalized with at least one (second) metal M2. Contacting a mixture comprising the at least two different organic compounds as described above, i.e. at least a first and a second different organic compound, with said inorganic membrane functionalized with a metal M2, ensures separation of said at least two organic compounds. More in particular, said first organic compound is separated from said second organic compound, e.g. the mixture is fractionated into a permeate comprising or enriched in at least a first organic compound and a retentate comprising or enriched in at least a second organic moiety, wherein said first organic compound in said permeate has a higher degree of unsaturation than said second organic compound in said retentate. In particular embodiments, the methods comprise separately collecting said at least two different organic compounds.

In particular embodiments, the inorganic membrane is an inorganic membrane modified or grafted with an organic group Rf, wherein said organic group Rf is preferably substituted with an amine, alcohol, phosphine, acid or thiol group, and wherein said organic group $R_f$ is linked to said metal M1, preferably via a direct covalent Metal-Carbon (M-C) bond. In particular embodiments, the metal M2 is a transition metal, preferably a metal selected from the group consisting of Ag, Au, Cu, Zn, Fe, Ni, Co, Ru, Th, Ir, Pd, Pt or a combination thereof. In particular embodiments, metal M1 is Si, Al, or a group 4 transition metal, preferably Ti or Zr, or a mixture thereof.

In particular embodiments, the methods as envisaged herein relate to the separation of a mixture comprising at least two different aliphatic carboxylic acids, i.e. at least a first and a second aliphatic carboxylic acid, preferably mono or dicarboxylic acids, differing in the number and/or position of double bonds. Preferably, said at least two different organic compounds or aliphatic carboxylic acids are fatty acids, fatty acid esters, and/or fatty acid salts, differing (only) in the number and/or position of double bonds. In particular embodiments, said mixture comprising said at least two fatty acids, fatty acid esters, and/or fatty acid salts, is derived from a vegetable, algal or animal oil or fat.

Also within the context of the present invention are provided methods for producing a membrane suitable for the separation of a mixture comprising at least two organic compounds comprising a hydrocarbon moiety differing in the number and/or position of a carbon-carbon double bond, said method comprising the steps of contacting a membrane, such as an inorganic membrane, comprising at least a hydroxide or oxide of one first metal M1 with a metal M2 ion solution, thus obtaining a membrane functionalized with said metal M2. Preferably, the membrane is an inorganic membrane modified or grafted with an organic group Rf, wherein the organic group Rf is preferably substituted with an amine, alcohol, phosphine, acid or thiol group, wherein the organic group Rf is linked to metal M1, preferably via a direct covalent Metal-Carbon bond. Preferably, the metal M1 is Si, Al, a group 4 transition metal, more preferably Ti or Zr, or a mixture thereof. Preferably, the M2 ion solution is a solution of one or more transition metal ions, more preferably is a solution of an ion of Ag, Au, Cu, Zn, Fe, Ni, Co, Ru, Th, Ir, Pd, Pt or a combination thereof.

The present invention thus also provides inorganic membranes suitable for the separation methods described herein. More particularly, said inorganic membranes comprise at least a hydroxide or oxide of one first metal M1, which is Si, Al or a group 4 transition metal or a mixture thereof, and modified with an organic group Rf, preferably substituted with an amine, alcohol, phosphine, acid or thiol group, wherein the organic group Rf is linked to said metal M1, characterized in that said membrane is functionalized with at least one second metal M2, wherein said organic group Rf is linked to the metal M2, preferably Ag, Au, Cu, Zn, Fe, Ni, Co, Ru, Th, Ir, Pd, Pt or a combination thereof. In particular embodiments, said organic functional group Rf is linked to said metal M1 via a direct covalent Metal (M1)-Carbon bond.

Also provided within the context of the present invention are separation systems comprising the inorganic membranes as envisaged herein.

DETAILED DESCRIPTION OF INVENTION

Before the present invention is described, it is to be understood that this invention is not limited to particular systems, product and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the terms "functionalisation" or "functionalized", particularly in the context of functionalization of a membrane with a metal (M2), typically refers to the introduction of a metal (M2) in the membrane.

As used herein, the terms "modification", "modified" or "grafting", particularly in the context of modification or grafting of a membrane with an organic (functional) group (R$_f$), typically refers to the chemical modification of the membrane wherein an organic (functional) group is introduced in or grafted onto said membrane.

More in particular, "functionalization" or "modification" refers to surface functionalization or modification, wherein "surface" as used herein is understood to comprise the (macroscopic) outer surface of the membrane as well as the inner pore surfaces of the matrix making up the membrane.

The surface to which an organic functional group or metal is adhered may thus be an external surface and/or an internal surface of the membrane.

The term "alkyl" by itself or as part of another substituent, refers to a linear, branched or cyclic saturated hydrocarbon group or molecule joined by single carbon-carbon bonds. When a subscript is used herein following a carbon atom, the subscript refers to the number of carbon atoms that the named group may contain. Thus, for example, "C1-C4 alkyl" means an alkyl of one to four carbon atoms.

In the following passages, different aspects of the invention are defined in more detail. Each aspect so defined may be combined with any other aspect or aspects unless clearly indicated to the contrary. In particular, any feature indicated as being preferred or advantageous in one or more aspects may be combined with any other feature or features indicated as being preferred or advantageous in the same or another aspect.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination. It is to be understood that other embodiments may be utilised and structural or logical changes may be made without departing from the scope of the present invention. The following detailed description, therefore, is not to be taken in a limiting sense, and the scope of the present invention is defined by the appended claims.

A first aspect of the present invention provides methods for the separation of a mixture comprising at least two organic compounds, i.e. at least a first and a second organic compound, having a different degree of unsaturation, or stated otherwise, comprising a hydrocarbon moiety differing (essentially only) in the number and/or position of carbon-carbon double bonds. In particular the methods are especially suitable for the separation of compounds which apart from the difference in the number and/or position of carbon-carbon double bonds do not differ in the presence of substituents (other than hydrogen). The methods for separating the compositions with such high structural similarity provided herein involve contacting a mixture comprising these compounds with a membrane, particularly an inorganic membrane, functionalized with or associated with at least one metal M2. The methods result in the separation of said at least two organic compounds, or stated differently, in obtaining a mixture enriched in at least one of said at least two organic compounds. In particular embodiments, the methods may comprise the step of separately collecting at least one, preferably at least two, of said at least two organic compounds.

Accordingly, the methods provided herein allow the separation of compounds present in a mixture of similar organic compounds according to the number and/or position of the carbon-carbon double bonds present therein. Separating "according to degree of unsaturation" or "according to the number of carbon-carbon double bonds" is used herein interchangeably to mean separating at least a first organic compound of a higher degree of unsaturation from at least a second organic compound of a lesser degree of unsaturation or from a fully saturated organic compound. A higher degree of unsaturation corresponds to a higher number of carbon-carbon double bonds present in one of said organic compounds compared to the other. It is understood that the specific nature of the compounds which are envisaged for separation and the chemical structures resulting in the "higher or lesser degree of unsaturation" or "higher or lesser number of carbon-carbon double bonds" of one compound compared to the other can vary. Similarly, the mixture of compounds may vary provided that it contains at least two compounds which differ (only) in their degree of saturation.

Accordingly, in particular embodiments, the present invention relates to methods for the separation of at least one first organic compound having one, two or more unsaturated carbon-carbon bonds from at least one second, different organic compound having a lesser degree of unsaturation than said first organic compound, i.e. having no or fewer such unsaturated carbon-carbon bonds. In these embodiments, a mixture comprising said at least one first and said at least one second, different organic compound is contacted with a membrane, preferably an inorganic membrane, functionalized with at least one metal M2 as envisaged herein, thereby fractionating the mixture into a permeate comprising or enriched in said at least one first organic compound having a higher degree of unsaturation, and a retentate comprising or enriched in said at least one second, different organic compound having a lesser degree of unsaturation.

In particular embodiments, said at least two organic compounds, i.e. said at least a first and a second organic compound, have similar structural and physical properties, such as having a same main functional group, but differ in their degree of saturation (or unsaturation). In particular, they comprise a hydrocarbon moiety differing essentially only in the number and/or position of double bonds therein. For instance, said at least two organic compounds have similar molecular weights and/or boiling points. In particular embodiments, this implies that the molecular weights and/or boiling point of said at least two organic compounds do not differ by more than 35%, preferably not differing by more than 30 or 25%, even more preferably not differing by more than 20%, 15% or 10%.

In particular embodiments, the hydrocarbon moiety present in each of said at least two organic compounds, i.e. said at least a first and a second organic compound, comprises or consists of an aliphatic linear or branched carbon chain, or a cyclic carbon chain. The at least two organic compounds differ in the number and/or position of the double bond(s) of this hydrocarbon moiety. As used herein, "differing in the position of the double bond(s)" and similar terms are used to refer to either a different relative positioning of the double bond in the hydrocarbon moiety (between different respective carbon atoms) in each of the at least two organic compounds, and/or to a different cis/trans conformation of the respective carbon-carbon double bond when comparing the at least two organic compounds.

Optionally, the hydrocarbon moiety present in said at least two organic compounds may differ in the number of methylene ($—CH_2—$) groups as well. For instance, the difference between the at least two organic compounds may be that at least one organic compound has a hydrocarbon moiety with 1, 2, 3, 4 or more ($—CH_2—$) groups more than the corresponding hydrocarbon moiety of the one or more different organic compound in the mixture.

In particular embodiments, the invention envisages that the at least two organic compounds, i.e. said at least a first and a second organic compound, present in said mixture are at least two carboxylic acids, or derivatives thereof. The at least two different carboxylic acids have a hydrocarbon moiety wherein the number and/or position of carbon-carbon double bonds differ between the at least two carboxylic acids. Optionally, the number of methylene ($—CH_2—$) groups of the hydrocarbon moiety may also differ between the at least two carboxylic acids. Carboxylic acid derivatives, as envisaged herein, include (alkyl) esters, such as methyl or ethyl esters, amides or salts, such as alkali metal or alkaline earth metal salts. In preferred embodiments, said mixture comprises at least two carboxylic acid esters having a hydrocarbon moiety differing in the number and/or position of double bonds. Advantageously, using an ester derivative of said carboxylic acids may limit/avoid interference of the charge of said carboxylic acids (carboxylates) on the separation behaviour of said compounds.

In particular embodiments, the methods envisaged herein are methods for separating at least two different organic compounds, i.e. at least a first and a second organic compound, which are fatty acids or derivatives thereof from a mixture, whereby the at least two different fatty acids or derivatives thereof differ from each other essentially only in the number and/or position of carbon-carbon double bonds. Thus in particular embodiments, the at least two different fatty acids or derivatives thereof differ from each other in that they have a different degree of saturation. In particular embodiments, the mixture comprises at least one fatty acid or derivative thereof with a higher degree of unsaturation and at least one fatty acid or derivative thereof having a lesser degree of unsaturation or at least one fully saturated fatty acid. Optionally, the number of methylene ($—CH_2—$) groups of the fatty acid hydrocarbon moiety may differ between the at least two fatty acids as well.

Fatty acids comprise a large group of monocarboxylic aliphatic acids which can be saturated (i.e. no double bonds) or unsaturated (i.e. containing one or more double bonds). The aliphatic group is a hydrocarbon chain of about 6 to about 28 carbon atoms in the aliphatic chain, which can be linear or branched and contain 0, 1, 2, 3, 4 or more sites of double bond unsaturation. The most common of these acids contain from about 12 to about 22 carbon atoms in the aliphatic chain and 0, 1, 2, 3 or 4 double bonds. Unsaturated fatty acids may also differ in the position of one or more carbon-carbon double bonds, such as e.g. for omega-3 fatty acids, omega-6 fatty acids or omega-9 fatty acids. In addition, unsaturated fatty acids may also differ in the cis/trans conformation of the carbon-carbon double bond.

Fatty acid derivatives as envisaged herein include fatty acid esters, preferably fatty acid alkyl esters, and fatty acid salts.

Fatty acid alkyl esters, as envisaged herein, are reaction products of a fatty acid and an alcohol. In particular embodiments, the alcohol is a lower alkyl (C1-C9) alcohol, more preferably is a monohydric (C1-C4) alcohol, preferably methanol, ethanol, propanol or butanol, resulting in respectively fatty acids methyl esters (FAME), fatty acids ethyl esters (FAEE), fatty acids propyl esters or fatty acids butyl esters (FABE).

Methyl esters of fatty acids are generally produced commercially by methanolysis of naturally occurring triglycerides (fats and oils), rather than by reaction with fatty acids per se.

In particular embodiments, said mixture comprising at least two fatty acids, or derivatives thereof, is obtained by hydrolysis or alcoholysis (methanolysis) of a triglyceride source, particularly a vegetable, algal or animal oil or fat. Accordingly, in particular embodiments, the mixture which is used in the methods of the present invention is obtained from a vegetable, algal or animal oil or fat, such as by hydrolysis or alcoholysis.

In particular embodiments, the methods of the present invention thus may include the step of converting a vegetable, algal or animal oil or fat into a mixture of at least two fatty acids (or derivatives thereof), particularly into a mixture of fatty acids (or derivatives thereof) corresponding to the fatty acid composition of said oil or fat, prior to the separation of said mixture, as envisaged herein. Accordingly, the methods provided herein include methods for the separation of at least two different fatty acids or derivatives thereof from a vegetable, algal or animal oil or fat, which methods may comprise a step of converting said vegetable, algal or animal oil or fat into a mixture comprising fatty acids or derivatives thereof and separating therefrom said at least two different fatty acids or derivatives thereof.

In particular embodiments, said mixture comprising at least two different organic compounds is a mixture comprising at least two dicarboxylic acids or derivatives thereof (such as esters, amides or salts thereof), whereby the at least two different dicarboxylic acids or derivatives differ in number and/or position of carbon-carbon double bonds. Preferably, said dicarboxylic acid are aliphatic dicarboxylic acids having the general structure HOOC—R—COOH, with R being an aliphatic carbon chain with a different degree of saturation. Exemplary compounds include adipic acid, hexenedioic acid, succinic acid, fumaric acid, maleic acid, and the like. In particular embodiments, said mixture comprises at least two hydrocarbons with different degree of unsaturation In particular embodiments, said mixture comprising at least two organic compounds is a mixture comprising vitamin E derivatives such as at least one tocopherol and at least one tocotrienol.

In particular embodiments, said mixture of at least two organic compounds comprises said at least two organic compounds as envisaged herein, dissolved in a solvent. The selection of a suitable solvent depends on the nature of the organic compounds to be separated and is within the ordinary skill of the skilled person. For instance, suitable solvents for fatty acids or derivatives thereof include, but are not limited to, protic and aprotic organic solvents, such as lower alkyl alcohols, such as methanol or ethanol, liquid alkanes and hydrocarbons, such as pentane, hexane, heptane, isooctane or toluene and the like, or chloroform, methylene chloride, dimethylformamide.

The methods provided herein involve the use of an inorganic or organic membrane, functionalized with an M2 metal. In particular embodiments, the metal M2 as envisaged herein is a metal, particularly a metal ion, more particularly a transition metal or transition metal ion which is able to reversibly interact with unsaturated hydrocarbon moieties. Preferably, said metal is Ag, Au, Cu, Zn, Fe, Ni, Co, Ru, Th, Ir, Pd, Pt or a combination thereof. Particularly preferred is Ag.

The membrane as envisaged herein comprises a semipermeable structure functionalized with a metal M2, which allows separation of a mixture into a permeate, i.e. the components of said mixture passing through the membrane, and a retentate, i.e. the components of said mixture that is rejected or retained by the membrane. In particular embodiments, functionalization of the membrane with a metal M2 is performed by contacting said membrane with a solution comprising said metal M2 ion, such as by passing the M2 ion solution through the membrane.

In particular embodiments, said membrane as envisaged herein is a filtration membrane which can be used for microfiltration, ultrafiltration or nanofiltration, having a pore size ranging from 0.5 nm to about 100 or 200 nm, more preferably having a pore size ranging from about 0.5 to about 30, 40 or 50 nm, even more preferably ranging from about 0.5 or 1 nm to about 5, 10 or 20 nm, as measured by permporometry or nitrogen sorption techniques as known by the skilled person in the art.

In the context of the present invention, said membrane may be a polymeric (organic) membrane, a mixed matrix membrane or an inorganic membrane, functionalized with a metal M2, as further detailed below. In preferred embodiments, said membrane is an inorganic membrane.

A further aspect of the present invention provides a membrane functionalized with a metal M2 as envisaged herein for use in the separation of mixtures of organic compounds differing in degree of unsaturation, wherein said membrane may be a polymeric (organic) membrane, a mixed matrix membrane or an inorganic membrane. Advantageously, a polymeric membrane as envisaged herein is a crosslinked polymeric membrane for improving its stability in the specific solvent used in the separation. Suitable polymers which may be used to prepare the membrane and methods to prepare such membranes are known in the art. Exemplary polymers include polyvinyl alcohol, polyvinyl acetate, polyimide, polyaniline, polyacrylate, polyamide and the like, as well as blends or co-polymers of two or more of these polymers.

Advantageously, said membrane is an inorganic membrane, particularly a ceramic membrane, preferably having a pore size ranging from 0.5 nm to about 100 or 200 nm, more preferably having a pore size ranging from about 0.5 to about 30, 40 or 50 nm, even more preferably ranging from about 0.5 or 1 nm to about 5, 10 or 20 nm, as measured by permporometry or nitrogen sorption techniques as known by the skilled person in the art. Compared to polymeric membranes, inorganic or ceramic membranes are chemically inert and exhibit high mechanical, thermal and hydrothermal stabilities.

Accordingly, in particular embodiments, the present invention relates to an inorganic membrane comprising at least a hydroxide or oxide of a first metal M1 wherein said inorganic membrane is functionalized with at least one second metal M2 as envisaged herein, preferably M2 is a transition metal such as Ag, Au, Cu, Zn, Fe, Ni, Co, Ru, Th, Ir, Pd, Pt or a combination thereof. In particular embodiments, said metal M1 is selected from the group consisting of titanium, zirconium, aluminium, silicon, strontium, yttrium, lanthanum, hafnium, thorium, iron, manganese, or combinations thereof. In preferred embodiments, M1 is Si, Al, a transition metal of group 4 of the 1UPAC periodic table, preferably Ti or Zr, or a mixture thereof. In general, the inorganic membrane is preferably made of titanium oxide and/or zirconium oxide.

In particular embodiments, said membrane, preferably said inorganic membrane, is modified or grafted with an organic functional group $R_f$, also referred herein as an organic group $R_f$ or an organic moiety $R_f$, preferably a thiol, phosphine, alcohol, amine or acid functional group or a moiety comprising at least a thiol, amine, phosphine, alcohol or acid functional group, prior to functionalization with the metal M2.

Examples of $R_f$ moieties include but are not limited to moieties comprising an alkyl, haloalkyl, aryl, haloaryl, amines (primary, secondary and tertiary amines), thiols, chiral hydrocarbons, etc . . . and any combinations thereof, provided they contain one or more of a thiol, amine, phosphine, alcohol or acid functional group.

More particularly, the $R_f$ moiety as envisaged herein is preferably a moiety which is (i) a substituted alkyl, preferably $C_1$-$C_{16}$alkyl, more preferably substituted $C_1$-$C_8$alkyl; and (ii) a substituted aryl, preferably $C_6$-$C_{18}$aryl, more preferably $C_6$-$C_{12}$aryl; and any combinations thereof. Combinations may comprise combinations within groups (i) and (ii) given above as well as combination between these groups.

The $R_f$ moiety as envisaged herein may comprise lineair, branched or cyclic molecules. For instance, the term "alkyl" is intended to encompass linear, branched as well as cyclic alkyl. The term "aryl" is intended to encompass monocyclic, polycyclic or heterocyclic aryl.

Whenever the term "substituted" is used in the context of the present invention, particularly in the context of the organic $R_f$ moiety, it is meant to indicate that one or more hydrogens or carbons on the atom indicated in the expression using "substituted" is replaced with a selection from the indicated group (i.e. thiol, amine, phosphine, alcohol or acid functional group), provided that the indicated atom's normal valency is not exceeded, and that the substitution results in a chemically stable compound, i.e. a compound that is sufficiently robust to survive isolation to a useful degree of purity from a reaction mixture.

In particular embodiments, the organic group $R_f$ is selected so as to modify the hydrophobic character of the membrane and/or to promote the functionalization of the membrane with the metal M2, e.g. via an $R_f$-M2 linkage. Without being bound by theory, said organic group $R_f$ may be selected to control or promote the electron rich or deficient character of M2. In particular embodiments, the organic group $R_f$ is linked, preferably covalently linked, to said metal M1 of said inorganic membrane, either directly, via a metal-carbon bond M1-$R_f$, or indirectly, via a M1-O—P—$R_f$ bond or a M1-O—Si—$R_f$ bond, and wherein said organic group $R_f$ is also linked to the metal M2.

In particular embodiments, the membrane is a composite membrane comprising a (macro)porous support backing material providing mechanical strength, preferably made of inorganic material, coated at the surface with at least one separating membrane layer as envisaged herein, particularly an inorganic separating membrane layer comprising an oxide and/or hydroxide of metal M1.

Techniques for preparing the inorganic or ceramic membranes as envisaged herein are well known in the art. A commonly used technique for preparing inorganic membranes involves depositing one or more selective layers (comprising the M1 oxide and/or hydroxides) of a few hundreds of nanometers or less in thickness on a (macro) porous support. Functionalization of said inorganic membrane with a metal M2 as envisaged herein involves contacting said inorganic membrane comprising at least a hydroxide or oxide of one first metal M1 with a metal M2 ion solution.

In preferred embodiments, said inorganic membranes, in particular the surface of said inorganic membranes, are first modified by introducing or grafting an organic group onto said inorganic membrane, in particular onto the surface of said inorganic membrane, prior to functionalization with a metal M2. Advantageously, the prior (covalent) linking of the (external and/or internal) surface of the inorganic membrane to said organic group $R_f$ results in an increased membrane hydrophobicity and/or an increased membrane affinity to be functionalized with the M2 ion. Various methods have been reported to establish such first surface modification of ceramic membranes with an organic group $R_f$. It is well known that inorganic or ceramic membranes may be surface modified by, for instance, co-condensation reactions, grafting reactions with organosilane or phosphonic acids, polymerization reactions on the surface etc. Thus, in particular embodiments, the membrane, particularly the membrane surface, is first modified by reacting with an organometallic reagent, a phosphonate, a phosphinate or an organosilane comprising said organic moiety or organic functional group $R_f$, prior to the functionalization with a metal M2 as envisaged herein.

In particular embodiments, modification or grafting of the inorganic membrane with an inorganic group $R_f$ occurs via reaction with an organometallic reagent, such as a Grignard reagent and/or an organolithium reagent. A preferred procedure for the modification or grafting of an inorganic matrix via reaction with organometallic chemistry is based on the method for obtaining a modified matrix as described in international patent application WO2010/106167, which is hereby incorporated by reference. The term "inorganic matrix" as used herein, may refer to a substrate, matrix or particles comprising the metal (M1) oxides and/or hydroxides as such or in the form of a membrane. Thus, in certain embodiments, the reaction of the inorganic matrix with the organometallic reagent comprises an appropriate pretreatment of the inorganic matrix, including drying the matrix; reacting the dried matrix in the presence of a dry solvent with said organometallic reagent, thereby obtaining a modified matrix or membrane; and optionally, washing and drying the modified matrix or membrane. The modification via reaction with an organometallic compound as described in WO2010/106167 results in the modification or grafting of the matrix or membrane with one or more organic functional groups $R_f$, as defined herein, that are directly bound covalently to an element M1 as envisaged herein on a surface of said matrix via a direct M1-$R_f$ bond, more particularly, via a direct M1-carbon bond i.e. not including an oxygen bridge. Organometallic reagents as used herein may be represented by formula $R_f$-M3, or formula $R_f$-M3-X, or formula $R_f$-M3-$R_f'$, wherein $R_f$ and $R_f'$ can be different or identical, M3 is a metal selected from group 1 or 2 of the IUPAC periodic table, more particularly selected from Li and/or Mg, and wherein X is a halogen atom, and preferably Br, Cl or I.

In other particular embodiments, modification of the inorganic membrane with an organic group $R_f$ occurs via reaction with a phosphonate and/or a phosphinate. Various procedures for the modification of an inorganic matrix via a (condensation) reaction with phosphonates which are suitable for use in the present method are known in the art. An example of a suitable procedure is the one described in patent application US2002/0023573, which is hereby incorporated by reference. The modification via reaction with an phosphonate or phosphinate as described therein results in the modification of the matrix with an organic group $R_f$, as defined herein, that are bound covalently to a metal M1 on a surface of said inorganic matrix via a covalent M1-O—P—$R_f$ bond, more particularly via a covalent M1-O—P—C bond. With phosphonates, the same phosphorous atom may be bound to the matrix via a mono-, bi-, or tridentate bond (i.e. via one, two, or three P—O-M1 bonds). The M1-O—P—$R_f$ bond typically provides sufficient stability for use of the modified, and subsequently M2 functionalized inorganic membrane in filtration, for cleaning of the material, etc.

It is noted that where the organic group Ri comprises a functional group which is not compatible with the modification process (via reaction with organometallic reagents or phosphonates), such group is typically provided in a protected form (i.e. with a protecting group), that is removed after the modification reaction. Protecting groups, as well as the methods for removing them, are well known in the art and will not be discussed in detail herein.

In other particular embodiments, modification of the inorganic membrane with an organic group $R_f$ occurs via reaction with an organosilane reagent. Reaction of the inorganic matrix with an organosilane results in the modification of the matrix with an organic group $R_f$ moiety which is bound covalently to a metal M1 as envisaged herein on a surface of said matrix via a covalent M1-O—Si—$R_f$ bond, more particularly via a covalent M1-O—Si—C bond. The M1-O—Si—$R_f$ bond typically is less stable than a direct M1-$R_f$ bond if M1 is a non-silicon metal. However, if M1 is silicon, the M1-O—Si—$R_f$ bond provides an excellent stability. In certain embodiments, the organic group Rf is bound covalently to M1 via a covalent M1-O—Si—$R_f$ bond, provided that M1 is silicon.

Various procedures for the modification of an inorganic matrix via a (condensation) reaction with organosilanes which are suitable for use in the present method are known in the art. An example of a suitable procedure is the one described in patent application US2006/237361, which is hereby incorporated by reference.

In certain embodiments, the inorganic matrix comprising the metal M1, such as comprising silica, alumina, titania and zirconia oxides and/or hydroxides including mixtures thereof, are provided as particles in a mixed matrix membrane. For example, the particles may be embedded in a polymer matrix. The preparation of mixed matrix membranes and the selection of the size and amount of particles and (polymer) matrix material are well-known in the art, depending on the required characteristics of the membranes.

Another aspect of the present invention relates to a system or membrane module for the separation of a mixture of at least two organic compounds, i.e. a mixture comprising at least a first and a second organic compound with different degree of unsaturation, as envisaged herein, comprising (i) a membrane unit having a membrane as envisaged herein, a permeate side and a retentate side, (ii) at least one feed channel for feeding the mixture comprising said at least two organic compounds with different degree of unsaturation as envisaged herein to the retentate side of the membrane unit, (iii) at least one outlet channel at the permeate side for recovery of the permeate.

The membrane used in the methods and systems of the present invention may be utilized in the form of hollow fibers, tubes, films, sheets, etc. The methods of the present invention are preferably carried out in a continuous manner but may be performed batchwise, as well, in a single or multiple stages.

EXAMPLES

Example 1

Functionalization of a Ceramic Membrane with Silver & Palm Oil FAME Separation

A. Membrane Functionalization.

To a filtration unit fitted with a 120 mm single tube ceramic 0.9 nm or 1 nm $TiO_2$ membrane was added a 0.01 mol/L solution of silver nitrate in water. The solution was circulated and the temperature adjusted to 30° C. Transmembrane pressure was increased to 10 bar and the solution permeated with total return of the permeate to the filtration unit feed tank for 16 hours. The membrane was removed from the unit and washed with a little water before being dried and stored in the absence of light.

B. FAME Separation.

A 100 mL 3-necked flask equipped with mechanical stirrer, thermometer and condenser (to which a drying tube was attached) was heated to expel moisture. On cooling, 60 g (0.0723 mol, assuming a molecular weight of 829 for Palm oil) Palm oil was added to the flask, followed by 16.572 mL (13.115 g, 0.4093 mol) methanol. The mixture was stirred and heated to 60 C., at which point 0.3 g sodium methoxide (0.5%, by weight of oil) was added rapidly. The temperature rose to 63.3 C. in 1 min, and the reaction mixture become less turbid. Heating continued for 1 hr at 60-63 C. The reaction mixture was allowed to cool to room temperature, the ester and glycerol layers were separated in a separatory funnel.

2 g of the upper fatty acid methyl ester (FAME) layer was dissolved in dichloromethane-methanol (75:25 v/v ratio) (1000 ml). This solution was added to a filtration unit fitted with a 120 mm single tube Ag doped ceramic membrane. The solution was circulated and the temperature adjusted to 30° C. Transmembrane pressure was increased to 10 bar and solution permeated with total return of the permeate to the feed tank until a steady flux was obtained. The total return of the permeate was stopped and a 100 ml permeate fraction collected. Samples of the permeate and retentate were taken for analysis and the permeate returned to the feed tank. Collection of 100 ml permeate and sampling were repeated a further 2 times.

Example 2

Functionalization of a Ceramic Membrane, Modified with an Organic Group & Palm Oil FAME Separation A. Membrane Synthesis.

Several ceramic membranes modified with different organic groups were prepared as follows:

A1. Preparation of a TiO2 Membrane, Modified with Benzaldehyde.

A TiO2 membrane was dried at 190° C. under high vacuum ($5.10^{-5}$ mbar) overnight.

Next, a dried reaction vessel was charged with the dried membrane and with 220 ml of dry THF followed by 11.5 mL of 4-(Benzaldehyde diethylacetal)magnesium bromide 1 M solution (i.e. a 0.05 M solution of 4-(Benzaldehyde diethylacetal)magnesium bromide solution in dry THF).

Figure 1A:
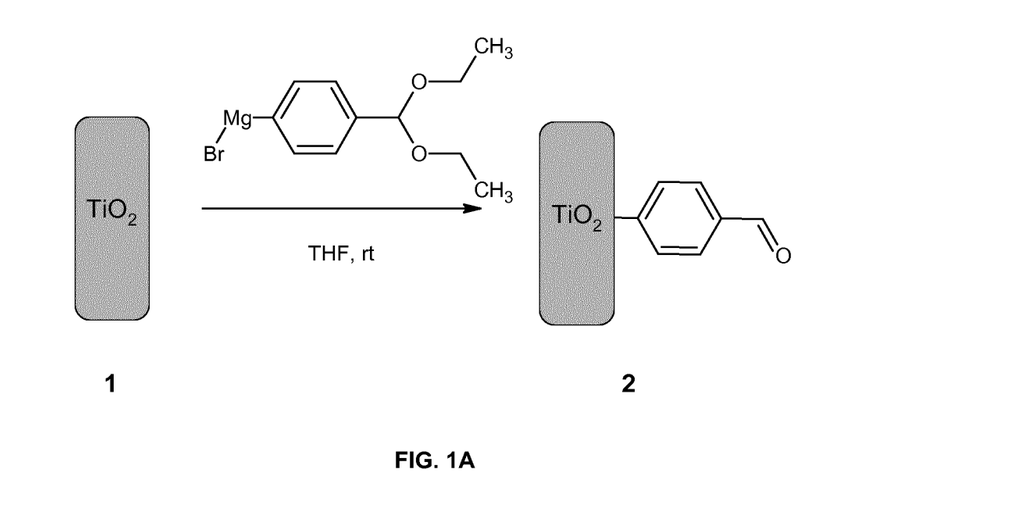
FIG. 1A represents the reaction to obtain a ceramic TiO2 membrane, modified with a benzaldehyde organic group, according to a specific embodiment.

Next, the reaction mixture was stirred at room temperature for 24 h under argon atmosphere (in the glove box). The reaction is presented in FIG. 1A.

The Grignard solution was discarded and the membrane was washed with dry THF and then placed in a cross-flow system and washed with AcOH 0.1 N in water at 50° C., followed by washing with water at 50° C.

The membrane was then placed in a reaction vessel that was charged with water. The water was stirred at 90° C. overnight (hydrolysis). The water was then discarded and the membrane washed with water and then dried at 60° C. under vacuum.

This way, a dried ceramic membrane, modified with benzaldehyde (also referred to as the benzaldehyde ceramic membrane) was obtained.

A2. Further Modification of the Benzaldehyde Modified Ceramic Membrane.

Figure 1B:
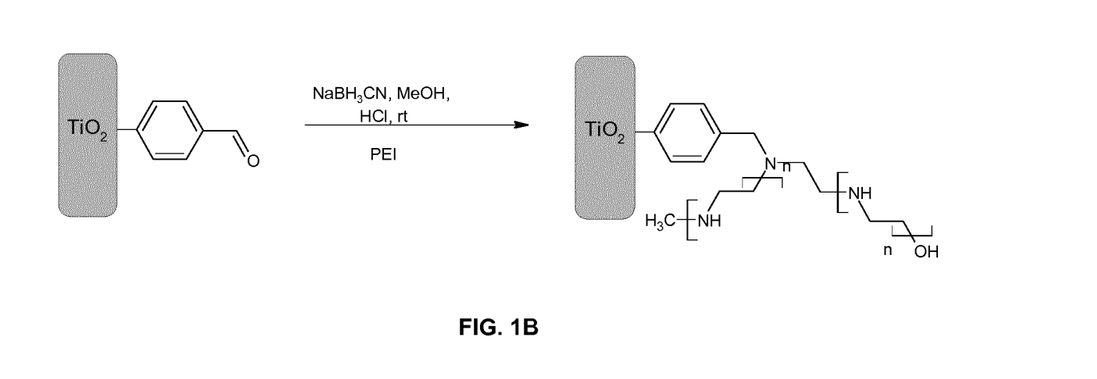
FIG. 1B represents the further modification of a ceramic TiO2 membrane, modified with a benzaldehyde organic group, with polyethyleneimine, according to a specific embodiment.

In a first experimental setup, the dried benzaldehyde modified membrane from section A1 above was placed in a in a sealed vessel with a solution of polyethylenimine (with linear average $M_n$ 5000, PDI<1.2) (CAS number 9002-98-6, 536 mg, 0.05 M/amine function) in a MeOH (230 ml). HCl in MeOH 3N was added to have a pH between 5-7. The reaction mixture was stirred overnight at 40° C. NaBH$_3$CN (CAS number 25895-60-7, MW: 62.84 g/mol, 188 mg, 0.1 N) was then added. The mixture was stirred at 40° C. overnight. The reaction is presented in FIG. 1B. The modified membrane was recovered by simply pouring out the solution. Subsequently, the membrane was washed at room temperature with MeOH (stirring in 230 ml for 30 min×3), and then water (2×230 ml) and then was fixed in a crossflow set-up at a pressure of 2 bars for washing with water (~1 L) inside of the pores. Then, the membrane was dried at room temperature first and then at 65° C. under vacuum.

Figure 1C:
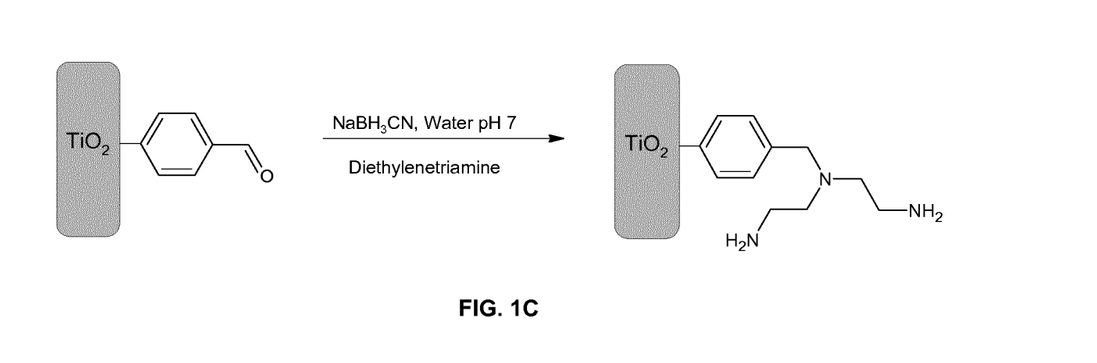
FIG. 1C represents the further modification of a ceramic TiO2 membrane, modified with a benzaldehyde organic group, with diethylenetriamine, according to a specific embodiment.

In a second experimental setup, the dried benzaldehyde modified membrane was placed in a in a sealed vessel with a solution of diethylenetriamine (CAS number 111-40-0, MW: 103.17; d=0.955, 2.37 g, 2.5 ml, 0.1 M) in a pH 7 buffer phosphate solution (230 ml). This solution was stirred overnight at 40° C. NaBH$_3$CN (CAS number 25895-60-7, MW: 62.84 g/mol, 1.44 g, 0.1 N) was then added. The mixture was stirred at room temperature for a few days and NaBH$_3$CN (CAS number 25895-60-7, MW: 62.84 g/mol, 157 mg) was added again. The reaction mixture was stirred at room temperature overnight. The reaction is presented in FIG. 1C.

The modified membrane was recovered by simply pouring out the solution. Subsequently, the membrane was washed at room temperature with water (stirring in 230 ml for 30 min×3), then was fixed in a crossflow set-up at a pressure of 2 bars for washing with water (~1 L) inside of the pores. Next, the membrane was dried at room temperature first and then at 65° C. under vacuum.

Figure 1D:
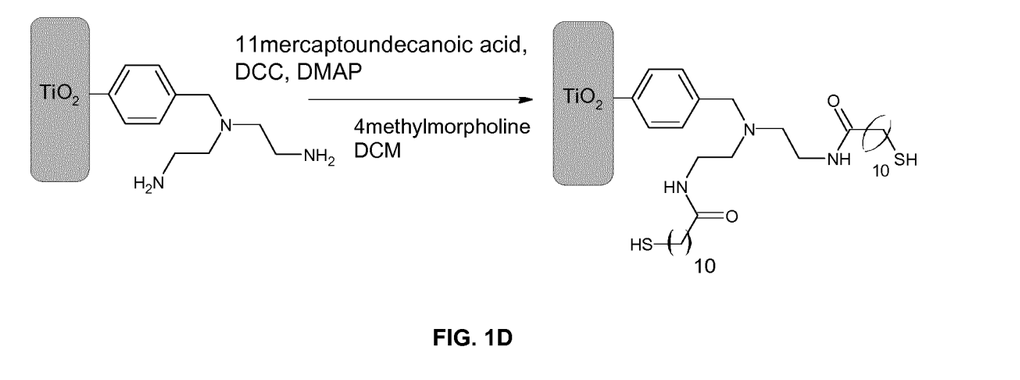
FIG. 1D represents the further modification of a ceramic TiO2 membrane, modified with a diethylenetriamine derivatized benzaldehyde organic group with 11-mecaptoundecanoic acid, according to a specific embodiment.

The ethylenetriamine derived benzaldehyde ceramic membrane was also further modified by reaction with 11-mecaptoundecanoic acid, as represented in FIG. 1D.

A dried reaction vessel was then charged with the dried membrane and with 200 ml dichloromethane, followed by a solution of 11-mecaptoundecanoic acid (19 g), N,N-dicyclohexylcarbodiimide (20 g), dimethylaminopyridine (200 mg) in 100 ml dichloromethane.

To the mixture 10 ml 4-methylmorpholine was added. The mixture was stirred at 25° C. for 16 hours. Next, the modified membrane was recovered by pouting out the solution and washing the membrane with dichloromethane (2×230 ml). Next, the membrane was fixed in a crossflow set-up at a pressure of 2 bars for washing with ethanol (~500 ml) followed by (water (~1 L) inside of the pores. Then, the membrane was dried at room temperature first and then at 65° C. under vacuum.

In addition, as an alternative, sulphobenzoic acid can be used instead of 11-mercaptoundecanoic acid.

A3. Preparation of a Phosphonic Aacid Modified TiO2 Membrane.

Figure 1E:
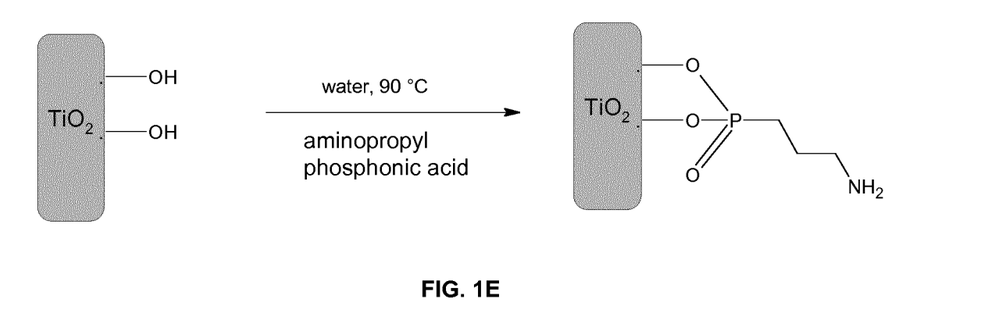
FIG. 1E represents the reaction to obtain a ceramic TiO2 membrane, modified with aminopropyl phosphonic acid, according to a specific embodiment.

An unmodified TiO2 membrane was immersed in a aminopropyl phosphonic acid (0.01 M) in water, and heated to at 90° C. for 4 hours, with stirring. The reaction is presented in FIG. 1E. The modified membrane was recovered by simply pouring out the phosphonic acid solution. Subsequently, the membrane was washed at room temperature with water (2×230 ml) and then was fixed in a crossflow set-up at a pressure of 2 bars for washing with water (~1 L)

inside of the pores. Then, the membrane was dried at room temperature first and then at 65° C. under vacuum.

Figure 1F:
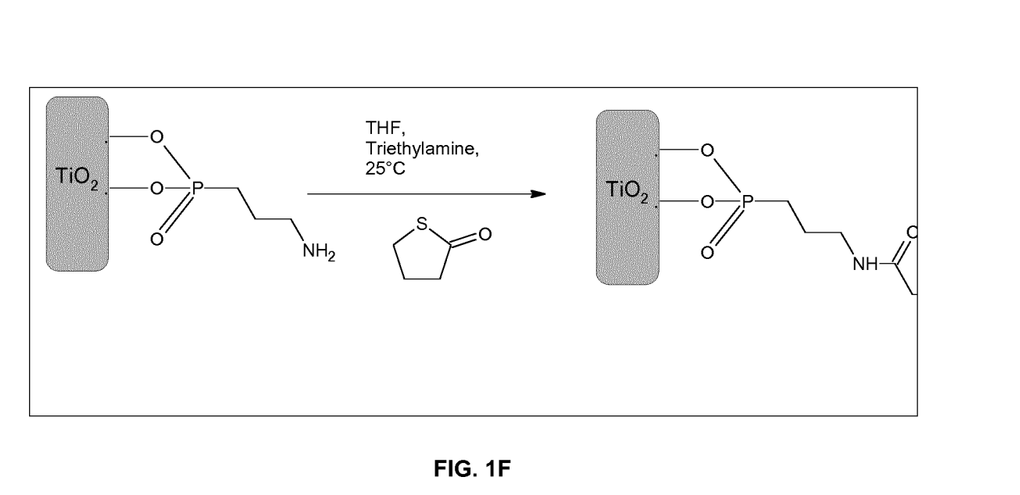
FIG. 1F represents the further modification of a ceramic TiO2 membrane, modified with aminopropyl phosphonic acid, with thiobutyrolactone, according to a specific embodiment.

The phosphonic acid modified TiO2 membrane was further modified with thiobutyrolactone. A dried reaction vessel was charged with the dried membrane and then with 300 ml of dry THF followed by 2.6 mL of thiobutyrolactone and 4.2 ml of triethylamine. Next, the reaction mixture was stirred at 60° C. for 24 h under argon atmosphere (in the glove box). The reaction is shown in FIG. 1F.

The modified membrane was recovered by pouring out the solution. Subsequently, the membrane was washed at room temperature with THF (2×230 ml) and then was fixed in a crossflow set-up at a pressure of 2 bars for washing with acetone (~500 ml) followed by (water ~1 L) inside of the pores. Then, the membrane was dried at room temperature first and then at 65° C. under vacuum.

B. Membrane Functionalization.

The modified membranes, as prepared in Section A above, was fixed in a crossflow set-up. A solution of silver nitrate in water (0.01 molar, 1.0 L) was added to the system. The membrane was subjected to nanofiltration with the silver nitrate solution circulation and at a pressure of 10 bars for 12 hours. Permeate was returned directly to the feed tank during this period.

C. FAME Separation.

FAME separation was essentially as in example 1, Section B above.

An air dried silver functionalized ceramic membrane, modified as in Example 2, Section A above, was fixed in a crossflow set-up. To this set up was added a solution of a fatty acid methyl ester mixture dissolved in 500 ml of isopropanol. The solution was circulated without pressure for 10 minutes. Membrane temperature was brought to below 20° C. and 5 bar pressure was applied. Permeate was collected over a period of 4 hours with samples for analysis of the permeate and retentate taken every 50 ml of collected permeate.

The invention claimed is:

1. A method for separation of a mixture comprising at least a first organic compound and a second organic compound, wherein said at least a first organic compound and second organic compound comprise a hydrocarbon moiety, the hydrocarbon moiety differing between the at least a first organic compound and the second organic compound in quantity and/or position of carbon-carbon double bonds, said method comprising the step of contacting said mixture with an inorganic membrane, so that the mixture is fractionated into a permeate comprising or enriched in said first organic compound and into a retentate comprising or enriched in said second organic compound;
wherein said inorganic membrane comprises at least a hydroxide or oxide of one first metal, wherein the first metal is Si, Al or a group 4 transition metal or a combination thereof, and wherein said inorganic membrane is functionalized with at least one second metal, wherein the second metal is Ag, Au, Cu, Zn, Fe, Ni, Co, Ru, Th, Ir, Pd, Pt or a combination thereof.

2. The method according to claim 1 wherein the at least first organic compound in said permeate has a higher degree of unsaturation than the at least second organic compound in said retentate.

3. The method according to claim 1 wherein said inorganic membrane is an inorganic membrane modified or grafted with an organic group, and wherein said organic group is linked to said first metal.

4. The method according to claim 1, wherein the first metal is Ti or Zr, or a mixture thereof.

5. The method according to claim 1 wherein the at least a first organic compound and a second organic compound are aliphatic carboxylic acids.

6. The method according to claim 5 wherein said at least a first and a second organic compound are fatty acids, fatty acid esters, and/or fatty acid salts, differing in number and/or position of double bonds.

7. The method according to claim 6 wherein said mixture comprising said fatty acids, fatty acid esters, and/or fatty acid salts is derived from a vegetable, algal or animal oil or fat.

8. A method for producing a membrane suitable for the separation of a mixture comprising at least two organic compounds comprising a hydrocarbon moiety differing in number and/or position of a carbon-carbon double bond according to claim 1, said method comprising the steps of
(i) providing or preparing an inorganic membrane comprising at least a hydroxide or oxide of one first metal, wherein the first metal is Si, Al or a group 4 transition metal or a mixture thereof, and wherein said inorganic membrane is modified or grafted with an organic group, with said organic group linked to said first metal;
(ii) contacting the membrane of step (i) with an ion solution of a second metal, thus obtaining an inorganic membrane functionalized with the second metal, wherein the second metal is Ag, Au, Cu, Zn, Fe, Ni, Co, Ru, Th, Ir, Pd, Pt or a combination thereof.

9. The method according to claim 8, wherein the organic functional group is linked to said first metal via a direct covalent Metal-Carbon bond.

10. A separation system for separation of a mixture comprising at least a first organic compound and a second organic compound with different degrees of unsaturation, the separation system comprising a membrane unit, the membrane unit comprising an inorganic membrane, a permeate side and a retentate side, at least one feed channel for feeding the mixture to the retentate side of the membrane unit, and at least one outlet channel at the permeate side for recovery of the permeate, wherein the inorganic membrane comprises at least a hydroxide or oxide of one first metal, wherein the first metal is Si, Al or a group 4 transition metal or a mixture thereof, and wherein said membrane is functionalized with at least one second metal, wherein the second metal is Ag, Au, Cu, Zn, Fe, Ni, Co, Ru, Th, Ir, Pd, Pt or a combination thereof.

11. The method according to claim 1, wherein said inorganic membrane is an inorganic membrane modified or grafted with an organic group, substituted with an amine, alcohol, phosphine, acid or thiol group, and wherein said organic group is linked to said first metal via a direct covalent Metal-Carbon bond.

12. The method according to claim 1, wherein the first metal is Si, Al, or a group 4 transition metal, Ti or Zr, or a mixture thereof.

13. The method according to claim 1, wherein the at least a first and a second organic compound are aliphatic mono or dicarboxylic acids, differing in number and/or position of double bonds.

14. A method for producing a membrane suitable for separation of a mixture comprising at least two organic compounds comprising a hydrocarbon moiety differing in quantity and/or position of a carbon-carbon double bond according to claim 1, said method comprising the steps of
(i) providing or preparing an inorganic membrane comprising at least a hydroxide or oxide of one first metal, wherein the first metal is Si, Al or a group 4 transition metal or a mixture thereof, and wherein said inorganic membrane is modified or grafted with an organic group, substituted with an amine, alcohol, phosphine, acid or thiol group, with said organic group linked to said first metal;

(ii) contacting the membrane of step (i) with an ion solution of a second metal, wherein the second metal is Ag, Au, Cu, Zn, Fe, Ni, Co, Ru, Th, Ir, Pd, Pt or a combination thereof, thus obtaining an inorganic membrane functionalized with the second metal.

15. The separation system of claim 10, wherein the inorganic membrane is modified or grafted with an organic group, and wherein said organic group is linked to the first metal, and wherein said organic group is linked to the second metal.

16. The separation system of claim 15, wherein said organic group is linked to the first metal via a direct covalent metal-carbon bond.

17. The separation system of claim 10, wherein said organic group is substituted with an amine, alcohol, phosphine, acid or thiol group.

* * * * *